US006921101B1

(12) United States Patent
Lauren et al.

(10) Patent No.: US 6,921,101 B1

(45) Date of Patent: Jul. 26, 2005

(54) COMBINED WHEELCHAIR, WALKER, AND SITTING CHAIR

(76) Inventors: Givi Lauren, 104-40 Queens Blvd., Apt. 17J, Forest Hills, NY (US) 11375; Irma Lauren, 104-40 Queens Blvd., Apt. 17J, Forest Hills, NY (US) 11375

(*) Notice: Subject to any disclaimer, the term of this patent is extended or adjusted under 35 U.S.C. 154(b) by 124 days.

(21) Appl. No.: 10/359,492

(22) Filed: Feb. 7, 2003

(51) Int. Cl.[7] ................................................ B62B 3/02

(52) U.S. Cl. ...................... 280/642; 280/87.05; 135/67

(58) Field of Search ............................... 280/642, 647, 280/650, 47.34, 47.4, 87.021, 87.05; 135/65, 135/67, 85

(56) References Cited

U.S. PATENT DOCUMENTS 3,708,182 A 1/1973 Markirl
4,384,713 A * 5/1983 Deutsch et al. ............... 482/68
4,415,198 A 11/1983 Brearley
4,461,471 A * 7/1984 Brastow ...................... 482/68
4,759,562 A 7/1988 Vinyard et al.
4,974,620 A 12/1990 Quillan et al.
5,046,748 A * 9/1991 Oat-Judge ................ 280/47.34
5,172,715 A * 12/1992 Webb .......................... 135/67
5,353,824 A 10/1994 Woods et al.
5,370,408 A * 12/1994 Eagan ................... 280/33.994
5,409,028 A * 4/1995 Lee ............................ 135/66
5,560,636 A * 10/1996 Chen .......................... 280/642
5,605,345 A * 2/1997 Erfurth et al. ........... 280/250.1
5,647,602 A * 7/1997 Nevin ................... 280/87.021
5,657,783 A * 8/1997 Sisko et al. .................... 135/67
5,716,063 A * 2/1998 Doyle et al. ............. 280/87.05
5,772,234 A * 6/1998 Luo ........................... 280/642
5,816,593 A * 10/1998 Che ...................... 280/87.041
5,887,887 A * 3/1999 Keuning ..................... 280/641
5,988,670 A * 11/1999 Song et al. ................. 280/648
6,099,002 A * 8/2000 Uchiyama ............. 280/87.021
6,113,128 A * 9/2000 Watkins ...................... 280/647
6,311,708 B1 * 11/2001 Howle ......................... 135/67
6,318,392 B1 * 11/2001 Chen ........................... 135/67
6,338,355 B1 * 1/2002 Cheng ......................... 135/67
6,338,493 B1 * 1/2002 Wohlgemuth et al. ........ 280/30
6,340,168 B1 1/2002 Woleen
6,345,835 B1 * 2/2002 Watkins ...................... 280/650
6,371,142 B1 * 4/2002 Battiston ..................... 135/67
6,378,883 B1 * 4/2002 Epstein .................... 280/250.1
6,386,575 B1 * 5/2002 Turner ........................ 280/647
6,478,327 B1 * 11/2002 Hartenstine et al. ........ 280/642
6,494,469 B1 * 12/2002 Hara et al. ............. 280/87.041
6,651,994 B2 * 11/2003 Hallgrimsson et al. 280/87.041

* cited by examiner

*Primary Examiner*—Christopher P. Ellis
*Assistant Examiner*—Christopher Bottorff
(74) *Attorney, Agent, or Firm*—Donald R. Schoonover

(57) ABSTRACT

A combined device includes a frame unit that has support braces located to provide support for a person entering or exiting the device and which are located to provide maximum stability to the device, even if the user has impaired balance, yet will not interfere with use of the device with a table or a desk. The device can be easily modified for use as either a wheelchair, or as a walker, or as a sitting chair.

6 Claims, 2 Drawing Sheets

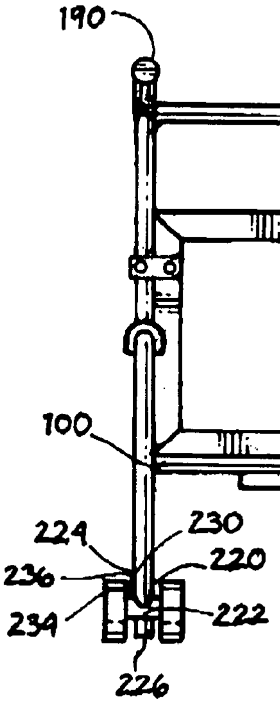
FIG. 3
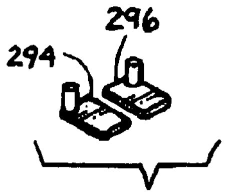
FIG. 5.
FIG. 6.
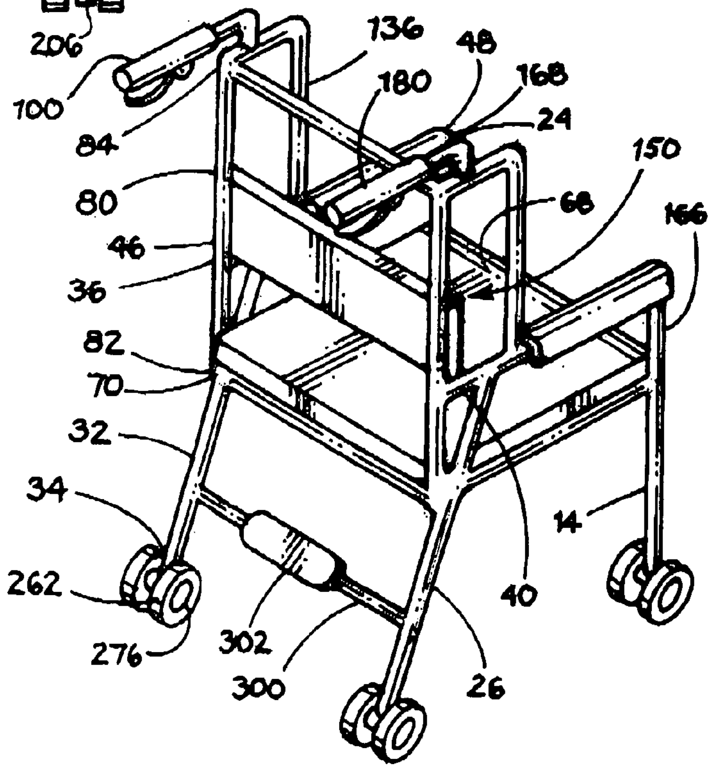
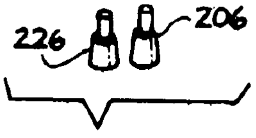
FIG. 4

COMBINED WHEELCHAIR, WALKER, AND SITTING CHAIR

BACKGROUND OF THE INVENTION

1. Field of the Invention

The present invention relates to the general art of chairs and seats, and to the particular field of interchangeable occupant-propelled and third party-assisted chairs and seats.

2. Discussion of the Related Art

Many people who require the use of a walker at times also require a wheelchair and as with everyone, a sitting chair. Often, these people are required to own more than one device in order to fulfill their needs. Not only is this expensive, it may also be wasteful of space and may require the person to move from one device to another. Space may be an important consideration in nursing and adult homes, and the like, where many people may require use of such devices. This, in turn, often requires the assistance of another person thereby inhibiting a person's mobility.

While the today's walker-chairs offer some similar functionality, they offer neither the safety nor do they fully satisfy all of the needs of certain individuals who at times require the wheelchair function as well.

Therefore, there is a need for a combination device, which is versatile and can be easily folded, stored, re-assembled. The device combines the functions of sitting, standing, ambulation assistance and assisted and self-propelled transfer (via wheelchair functionality), to be most versatile.

Still further, many people have a balance problem. This may make getting into, or out of a wheel-chair difficult. Some people may require the assistance of another person when getting into or out of presently available walker-chairs. If such an assistant is not available, the person may try to hold onto something outside of the chair, such as a table or the like. This may not be safe, especially if the person has a balance problem or is weak.

Therefore, there is a need for a combined device, which makes getting into, or out of the device as easy and safe as possible without requiring the person to hold on to an object located outside the device (which in most cases are non-stationary objects which creates for an unsafe transfer). Armrests on the device provide the necessary safety and comfort feature currently lacking in today's devices. Anything other than armrests is inherently anatomically and physiologically incorrect for people with low balance and muscle weakness.

Due to their currect structure, walker-chairs are not amenable for use at a table or at a desk because the front beams are not recessed and the chair cannot be pulled beneath the table or desk. If special designs for the tables or desks are required, comfort of use of the walker-chair would be restricted or the user's mobility may be inhibited. Therefore, there is a need for a combined device, which can be used in connection with presently existing tables and/or desks or the like.

PRINCIPAL OBJECTS OF THE INVENTION

It is a main object of the present invention to provide a combined device that is versatile.

It is another object of the present invention to provide a device, which combines the functions of a wheelchair (self-propelling and assisted), a walker and a sitting chair.

It is another object of the present invention to provide a device, which is easy to store, set up and modify.

It is another object of the present invention to provide a combined device, which can be used with presently existing tables and desks.

It is another object of the present invention to provide a combined device, which provides a sound support for a user during all phases of the use of the device.

It is another object of the present invention to provide a combined device, which promotes good posture.

It is another object of the present invention to provide a combined device, which permits a user to enter or exit the device safely, without grasping onto an element located outside the device.

SUMMARY OF THE INVENTION

These, and other, objects are achieved by a combined device which combines the functions of a wheelchair, a walker and a sitting chair in a manner that permits the maximum use of the device yet still permits the device to be easily and efficiently used and stored.

The device includes armrests, located in a way so a person can easily grasp them for support to perform anatomically and physiologically correct seat to stand transfer, whereby the person need not grasp an element located outside the device. The support braces are also located with respect to the seat of the device so the device remains stable during such entry or exit movements even by someone who may have balance problems. The support braces are spaced apart from the front of the device so the device can easily fit to a table or desk. This permits the user to ambulate, transfer, utilize wheelchair and seating chair functionality with maximum safety and adaptability.

BRIEF DESCRIPTION OF THE DRAWING FIGURES

FIG. 3 is a rear elevational view of the combined device embodying the present invention with a back support pillow strapped thereto.

FIG. 4 is a perspective view of two foot rests that are used in the combined device of the present invention.

FIG. 5 is a perspective view of two walker covers that are used in the combined device of the present invention.

FIG. 6 is a rear perspective view of a combined device embodying the present invention with a foot pedal mounted on a rear cross brace element.

DETAILED DESCRIPTION OF THE PREFERRED EMBODIMENT

Figure 1:
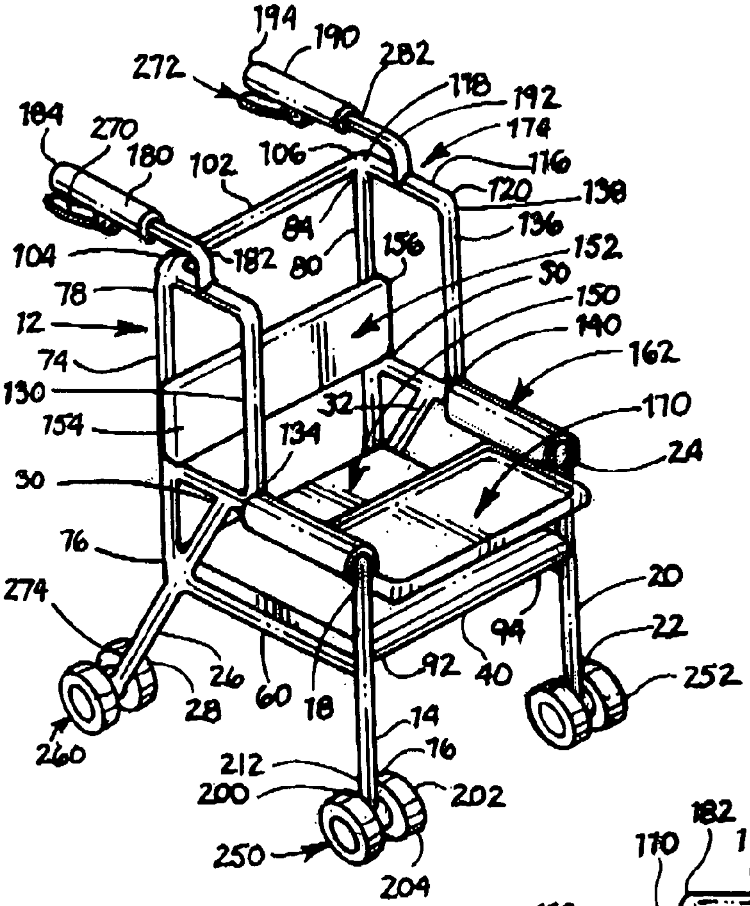
FIG. 1 is a front perspective view of the combined device embodying the present invention with wheel units on all legs thereof.

Other objects, features and advantages of the invention will become apparent from a consideration of the following detailed description and the accompanying drawings.

The device embodying the present invention combines the functions of a wheelchair, a walker, and a sitting chair. In the interest of brevity, the combined wheelchair, walker, and sitting chair will be referred to herein as a combined device. As shown in the figures, the invention is embodied in a combined device 10. The combined device 10 comprises a frame unit 12 which includes a first front leg element 14 which extends vertically upward in the use orientation shown in FIG. 1 and has a first end 16 and a second end 18 with the first end 16 of the first front leg element 14 being located beneath the second end 18 of the first front leg element 14 in the use orientation. Device 10 further includes a second front leg element 20 which extends vertically upward in the use orientation and has a first end 22 and a second end 24 with the first end 22 of the second front leg element 20 being located beneath the second end 24 of the second front leg element 20 in the use orientation. A first rear leg element 26 extends upward at an oblique angle in the use orientation and has a first end 28 and a second end 30 with the first end 28 of the first rear leg element 26 being located beneath the second end 30 of the first rear leg element 26 in the use orientation. A second rear leg element 32 extends upward at an oblique angle in the use orientation and has a first end 34 and a second end 36 with the first end 34 of the second rear leg element 32 being located beneath the second end 36 of the second rear leg element 32 in the use orientation.

A first arm rest element 40 connects second end 18 of the first front leg element 14 to second end 30 of first rear leg element 26. The first arm rest element 40 has a first end 42 connected to second end 18 of the first front leg element 14 and a second end 44 spaced apart from the second end 30 of the first rear leg element 26 with the second end 30 of the first rear leg element 26 being connected to the first arm rest element 40 at a location between first end 42 of the first arm rest element 40 and second end 44 of the first arm rest element 40. A second arm rest element 46 connects second end 24 of the second front leg element 20 to second end 36 of the second rear leg element 32. The second arm rest element 46 has a first end 48 connected to second end 24 of the second front leg element 20 and a second end 50 spaced apart from second end 36 of the second rear leg element 32 with the second end 30 of the first rear leg element 26 being connected to the second arm rest element 46 at a location between first end 48 of the second arm rest element 46 and second end 50 of the second arm rest element 46.

A first cross arm element 60 connects the first front leg element 14 to the first rear leg element 26. The first cross arm element 60 has a first end 62 connected to the first front leg element 14 at a location between first end 16 of the first front leg element 14 and second end 18 of the first front leg element 14, and a second end 64 connected to first rear leg element 26 at a location between the first end 28 of the first rear leg element 26 and the second end 30 of the first rear leg element 26. The first cross arm element 60 extends parallel to the first arm element 40. A second cross arm element 66 connects second front leg element 20 to second rear leg element 32. The second cross arm element 66 has a first end 68 connected to second front leg element 20 at a location between the first end 22 of the second front leg element 20 and the second end 24 of the second front leg element 20, and a second end 70 connected to second rear leg element 32 at a location between the first end 34 of the second rear leg element 32 and the second end 36 of the second rear leg element 32. The first cross arm element 60 extends parallel to the second arm element 46.

A first back rest element 74 has a first end 76 connected to first rear leg element 26 adjacent to the second end 64 of the first cross arm element 60 and extends vertically upward therefrom in a use orientation. The first back rest element 74 has a second end 78 located above the first end 76 of the first back rest element 74 in the use orientation. A second back rest element 80 has a first end 82 connected to second rear leg element 32 adjacent to the second end 70 of the second cross arm element 66 and extends vertically upward therefrom in a use orientation. The second back rest element 80 has a second end 84 located above the first end 82 of the second back rest element 80 in the use orientation.

A front cross brace element 90 has a first end 92 connected to the first front leg element 14 adjacent to the first end 62 of the first cross arm element 60 and a second end 94 connected to the second front leg element 20. A rear cross brace element 96 has a first end 98 connected to the first rear leg element 26 adjacent to the second end 64 of the first cross arm element 60 and a second end 100 connected to the second rear leg element 32.

The first or front cross brace element 90 and the rear cross brace element 96 and the first cross arm element 60 and the second cross arm element 66 are all co-planar with each other.

A second rear cross brace element 102 has a first end 104 connected to the second end 78 of the first back rest element 74 and a second end 106 connected to the second end 84 of the second back rest element 80. The second rear cross brace element 102 is parallel to first rear cross brace element 96.

A first top brace element 110 has a first end 112 connected to the second end 78 of the first back rest element 74 and a second end 114. The first top brace element 110 extends parallel to the first arm rest element 40. A second top brace element 116 has a first end 118 connected to the second end 84 of the second back rest element 80 and a second end 120. The second top brace element 116 extends parallel to the second arm rest element 46.

A first support brace element 130 has a first end 132 connected to the second end 114 of the first top brace element 110, and a second end 134 connected to the first arm rest element 40 at a location between second end 30 of the first rear leg element 26 and first end 42 of the first arm rest element 40. The first support brace element 130 extends vertically upward from the second end 134 of the first support brace element 130 to the first end 132 of the first support brace element 130 in a use orientation as shown in FIG. 1. A second support brace element 136 has a first end 138 connected to the second end 120 of the second top brace element 116, and a second end 140 connected to the second arm rest element 46 at a location between the second end 36 of second rear leg element 32 and the first end 48 of the second arm rest element 46. The second support brace element 136 extends vertically upward from the second end 140 of the second support brace element 136 to the first end 138 of the second support brace element 136 in a use orientation.

A seat unit 150 is mounted on the first or front cross brace element 90 and the rear cross brace element 96 and the first cross arm element 60 and the second cross arm element 66.

A back support element 152 has a first end 154 connected to the first back rest element 74 at a location adjacent to the first arm rest element 40 and a second end 156 connected to the second back rest element 80 at a location adjacent to the second arm rest element 46.

A first arm rest cover element 160 is mounted on the first arm rest 40 between the second end 134 of the first support brace element 130 and the first end 42 of the first arm rest element 40, and a second arm rest cover element 162 is mounted on the second arm rest 46 between the second end 140 of the second support brace element 136 and the first end 48 of the second arm rest element 46.

A first tray mounting element 166 is mounted on the first arm rest element 40 and a second tray mounting element 168 is mounted on the second arm rest element 46. A tray 170 is mounted on the mounting elements 166, 168 to support food, work, or the like, for a person sitting in the device 10.

A first handle element pivot mount 172 is located on the first top brace element 110 and a second handle element pivot mount 174 is located on the second top brace element 116.

A first handle element 180 has a proximal end 182 pivotally mounted in the first handle element pivot mount 172 and a distal end 184 spaced apart from the proximal end 182 of the first handle element 180. The first handle element 180 is pivotally movable between a use position, shown in FIG. 1, having the second top brace element 116 located between the distal end 184 of the first handle element 180 and the proximal end 182 of the first handle element 180, and a stored position, shown in FIG. 2, having the first support brace 130 located between the distal end 184 of the first handle element 180 and the proximal end 182 of the first handle element 180.

A second handle element 190 has a proximal end 192 pivotally mounted in the second handle element pivot mount 174 and a distal end 194 spaced apart from the proximal end 192 of the second handle element 190. The second handle element 190 is pivotally movable between a use position, shown in FIG. 1, having the second top brace element 116 located between the distal end 194 of the second handle element 190 and the proximal end 192 of the second handle element 190, and a stored position, shown in FIG. 2, having the second support brace 136 located between the distal end 194 of the second handle element 190 and the proximal end 192 of the second handle element 190.

A first sleeve 200 is telescopingly connectable to the first front leg 14 of the frame unit 12. The first sleeve 200 includes a first end 202, a second end 204, and a cover 206 on the second end 204 of the first sleeve 200. A first lock 208 releasably connects the first sleeve 200 to the first front leg 14 and includes a plurality of holes, such as hole 210, defined through the first sleeve 200 with the holes 210 being spaced apart from each other from adjacent to the first end 202 of the first sleeve 200 toward the second end 204 of the first sleeve 200. A button 212 on the first front leg 14 of the frame unit 12 is received in one of the plurality of holes 210 of the first sleeve 200 when the first sleeve 200 is connected to the first front leg 14 of the frame unit 12. A second sleeve 220 is telescopingly connectable to the second front leg 20 of the frame unit 12, and includes a first end 222, a second end 224, and a cover 226 on the second end 224 of the second sleeve 220. A second lock 230 releasably connects the second sleeve 220 to the second front leg 20 and includes a plurality of holes, such as hole 234 defined through the second sleeve 220 with the holes 234 being spaced apart from each other from adjacent to the first end 222 of the second sleeve 220 toward the second end 224 of the second sleeve 220. A button 236 is on the second front leg 20 of the frame unit 12. The button 236 is received in one of the plurality of holes 234 of the second sleeve 220 when the second sleeve 220 is connected to the second front leg 20 of the frame unit 12.

One form of the device 10 further includes a third sleeve telescopingly connectable to the first front leg 14 of the frame unit 12, the third sleeve including a first end and a second end. The further form also includes a third lock releasably connecting the third sleeve to the first front leg 14, the third lock including a plurality of holes defined through the third sleeve with the holes being spaced apart from each other from adjacent to the first end of the third sleeve toward the second end of the third sleeve, the button on the first front leg 14 of the frame unit 12 being received in one of the plurality of holes of the third sleeve when the third sleeve is connected to the first front leg 14 of the frame unit 12. The further form also includes a fourth sleeve telescopingly connectable to the second front leg 20 of the frame unit 12. The fourth sleeve including a first end and a second end. A fourth lock releasably connects the fourth sleeve to the second front leg 20, the fourth lock including a plurality of holes defined through the fourth sleeve with the holes being spaced apart from each other from adjacent to the first end of the fourth sleeve toward the second end of the fourth sleeve, the button on the second front leg 20 of the frame unit 12 being received in one of the plurality of holes of the fourth sleeve of when the fourth sleeve is connected to the second front leg 20 of the frame unit 12.

Wheel units, such as first wheel unit 250 and second wheel unit 252, can be connected to either the first and second sleeves 200, 220 or to the third and fourth sleeves as desired.

A first set of rear wheels 260 is mounted on the first end 28 of the first rear leg element 26, and a second set of rear wheels 262 is mounted on the first end 34 of the second rear leg element 32.

Device 10 further comprises a brake unit which includes a first brake handle 270 on the first handle element 180 and a second brake handle 272 on the second handle element 190. A first brake shoe element 274 is on the first set of rear wheels 260, and a second brake shoe element 276 is on the second set of rear wheels 262. A first connection mechanism 280 operably connects the first brake handle 270 to the first brake shoe element 274 and a second connection mechanism 282 operably connects the second brake handle 272 to the second brake shoe element 276. The brake connection mechanisms 280, 282 may include cables, joints, and the like such as might be used to connect the hand brake of a bicycle to the brake shoes of the bicycle as will be understood by those skilled in the art. Thus, the exact structure of the brake mechanisms will not be discussed in detail. Brakes can also be operated by a person sitting in the device using straps, or the like, as is known to those skilled in the art. The strap brakes can be used to provide further stability to the device 10 while the person is moving into or out of the device 10.

The first cross brace element 90 and the rear cross brace element 96 and the first cross arm element 60 and the second cross arm element 66 are all located beneath the second ends 134, 140 of the first and second support brace elements 130, 136 at a distance sufficient to locate a center of gravity of the frame unit 12 beneath the second ends 134, 140 of the first and second support brace elements 130, 136. A weight, such as weight 288, can be included to further control the location of the center of gravity of the device 10 and thus increase the stability thereof.

Figure 2:
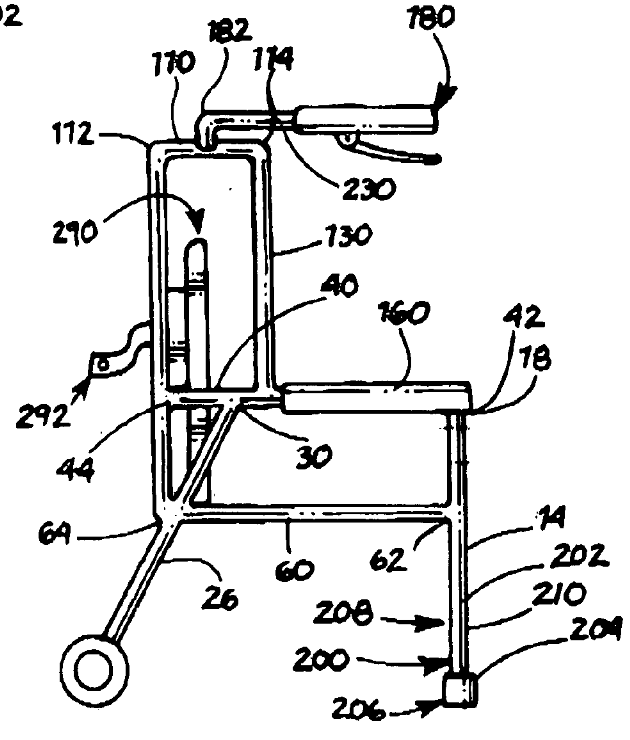
FIG. 2 is a side elevational view of the combined device embodying the present invention with walker covers on the two front legs thereof, the side opposite to the side shown in FIG. 2 being identical thereto.

Another form of the device 10 includes a back support cushion 290 having straps, such as strap 292, which releasably engage the back support element 152 when the back support cushion 290 is in place, as shown in FIG. 2. The back support cushion 290 assists in maintaining proper posture. The device 10 may also include first and second foot rest elements 294 and 296, as shown in FIG. 5, mounted on the front cross brace element 90. Yet another form of the device 10, shown in FIG. 6, includes a lower cross brace element 300 and a foot pedal 302 on the lower rear cross brace element 300. The lower cross brace element 300 and the foot pedal 302 provide further control of the device 10 for a person pushing the device 10.

It is understood that while certain forms of the present invention have been illustrated and described herein, it is not to be limited to the specific forms or arrangements of parts described and shown.

What is claimed and desired to be covered by Letters Patent is:

1. A combined device comprising:

a) a frame unit which includes HP23(1) a first front leg element which extends vertically upward in the use orientation and has a first end and a second end with the first end of the first front leg element being located beneath the second end of the first front leg element in the use orientation, HP23(2) a second front leg element which extends vertically upward in the use orientation and has a first end and a second end with the first end of the second front leg element being located beneath the second end of the second front leg element in the use orientation, HP23(3) a first rear leg element which extends upward at an oblique angle in the use orientation and has a first end and a second end with the first end of the first rear leg element being located beneath the second end of the first rear leg element in the use orientation, HP23(4) a second rear leg element which extends upward at an oblique angle in the use orientation and has a first end and a second end with the first end of the second rear leg element being located beneath the second end of the second rear leg element in the use orientation, HP23(5) a first arm rest element connecting the second end of the first front leg element to the second end of the first rear leg element, the first arm rest element having a first end connected to the second end of the first front leg element and a second end spaced apart from the second end of the first rear leg element with the second end of the first rear leg element being connected to the first arm rest element at a location between the first end of the first arm rest element and the second end of the first arm rest element, HP23(6) a second arm rest element connecting the second end of the second front leg element to the second end of the second rear leg element, the second arm rest element having a first end connected to the second end of the second front leg element and a second end spaced apart from the second end of the second rear leg element with the second end of the first rear leg element being connected to the second arm rest element at a location between the first end of the second arm rest element and the second end of the second arm rest element, HP23(7) a first cross arm element connecting the first front leg element to the first rear leg element, the first cross arm element having a first end connected to the first front leg element at a location between the first end of the first front leg element and the second end of the first front leg element and a second end connected to the first rear leg element at a location between the first end of the first rear leg element and the second end of the first rear leg element, the first cross arm element extending parallel to the first arm element, HP23(8) a second cross arm element connecting the second front leg element to the second rear leg element, the second cross arm element having a first end connected to the second front leg element at a location between the first end of the second front leg element and the second end of the second front leg element and a second end connected to the second rear leg element at a location between the first end of the second rear leg element and the second end of the second rear leg element, the first cross arm element extending parallel to the second arm element, HP23(9) a first back rest element having a first end connected to the first rear leg element adjacent to the second end of the first cross arm element and extending vertically upward therefrom in a use orientation, the first back rest element having a second end located above the first end of the first back rest element in the use orientation, HP23(10) a second back rest element having a first end connected to the second rear leg element adjacent to the second end of the second cross arm element and extending vertically upward therefrom in a use orientation, the second back rest element having a second end located above the first end of the second back rest element in the use orientation, HP23(11) a front cross brace element having a first end connected to the first front leg element adjacent to the first end of the first cross arm element and a second end connected to the second front leg element, HP23(12) a rear cross brace element having a first end connected to the first rear leg element adjacent to the second end of the first cross arm element and a second end connected to the second rear leg element, HP23(13) the first cross brace element and the rear cross brace element and the first cross arm element and the second cross arm element all being co-planar with each other, HP23(14) a second rear cross brace element having a first end connected to the second end of the first back rest element and a second end connected to the second end of the second back rest element, the second rear cross brace element being parallel to the first rear cross brace element, HP23(15) a first top brace element having a first end connected to the second end of the first back rest element and a second end, the first top brace element extending parallel to the first arm rest element, HP23(16) a second top brace element having a first end connected to the second end of the second back rest element and a second end, the second top brace element extending parallel to the second arm rest element, HP23(17) a first support brace element having a first end connected to the second end of the first top brace element and a second end connected to the first arm rest element at a location between the second end of the first rear leg element and the first end of the first arm rest element, the first support brace element extending vertically upward from the second end of the first support brace element to the first end of the first support brace element in a use orientation, and HP23(18) a second support brace element having a first end connected to the second end of the second top brace element and a second end connected to the second arm rest element at a location between the second end of the second rear leg element and the first end of the second arm rest element, the second support brace element extending vertically upward from the second end of the second support brace element to the first end of the second support brace element in a use orientation;

b) a seat unit mounted on the first cross brace element and the rear cross brace element and the first cross arm element and the second cross arm element;

c) a back support element having a first end connected to the first back rest element at a location adjacent to the first arm support element and a second end connected to the second back rest element at a location adjacent to the second arm rest element;

d) a first arm rest cover element mounted on the first arm rest between the second end of the first support brace element and the first end of the first arm rest element;

e) a second arm rest cover element mounted on the second arm rest between the second end of the second support brace element and the first end of the second arm rest element;

f) a first tray mounting element mounted on the first arm rest element;

g) a second tray mounting element mounted on the second arm rest element;

h) a first handle element pivot mount on the first top brace element;

i) a second handle element pivot mount on the second top brace element;

k) a first handle element having a proximal end pivotally mounted in said first handle element pivot mount and a distal end spaced apart from the proximal end of the first handle element, said first handle element being pivotally movable between a use position having the second top brace element located between the distal end of said first handle element and the proximal end of said first handle element and a stored position having the first support brace located between the distal end of the first handle element and the proximal end of the first handle element;

l) a second handle element having a proximal end pivotally mounted in said second handle element pivot mount and a distal end spaced apart from the proximal end of the second handle element, said second handle element being pivotally movable between a use position having the second top brace element located between the distal end of said second handle element and the proximal end of said second handle element and a stored position having the second support brace located between the distal end of the second handle element and the proximal end of the second handle element;

m) a first sleeve telescopingly connectable to the first front leg of said frame unit, the first sleeve including a first end and a second end, and a cover on the second end of the first sleeve, n) a first lock releasably connecting the first sleeve to the first front leg, the first lock including a plurality of holes defined through the first sleeve with the holes being spaced apart from each other from adjacent to the first end of the first sleeve toward the second end of the first sleeve, and a button on the first front leg of said frame unit, the button being received in one of the plurality of holes of the first sleeve of when the first sleeve is connected to the first front leg of said frame unit;

o) a second sleeve telescopingly connectable to the second front leg of said frame unit, the second sleeve including a first end and a second end, and a cover on the second end of the second sleeve, p) a second lock releasably connecting the second sleeve to the second front leg, the second lock including a plurality of holes defined through the second sleeve with the holes being spaced apart from each other from adjacent to the first end of the second sleeve toward the second end of the second sleeve, and a button on the second front leg of said frame unit, the button being received in one of the plurality of holes of the second sleeve of when the second sleeve is connected to the second front leg of said frame unit;

q) a first set of rear wheels mounted on the first end of the first rear leg element;

r) a second set of rear wheels mounted on the first end of the second rear leg element;

s) a brake unit including HP23(1) a first brake handle on said first handle element, HP23(2) a second brake handle on said second handle element, HP23(3) a first brake shoe element on said first set of rear wheels, HP23(4) a second brake shoe element on said second set of rear wheels, HP23(5) a first connection mechanism operably connecting the first brake handle to the first brake shoe element, and HP23(6) a second connection mechanism operably connecting the second brake handle to the second brake shoe element;

t) the first cross brace element and the rear cross brace element and the first cross arm element and the second cross arm element all being located beneath the second ends of the first and second support brace elements a distance sufficient to locate a center of gravity of said frame unit beneath the second ends of the first and second support brace elements; and u) a weight mounted on said frame unit.

2. The combined device as described in claim 1 further including a tray slidably mounted in the tray mounting elements.

3. The combined device as described in claim 1 further including a back support cushion having straps which releasably engage the back support element when said back support cushion is in place.

4. The combined device as described in claim 3 further including first and second foot rest elements mounted on the front cross brace element.

5. The combined device as described in claim 1 further including a lower cross brace element and a foot pedal on the lower rear cross brace element.

6. The device as described in claim 1 further including a third sleeve telescopingly connectable to the first front leg of said frame unit, the third sleeve including a first end and a second end, and a wheel unit on the second end of the third sleeve; a third lock releasably connecting the third sleeve to the first front leg, the third lock including a plurality of holes defined through the third sleeve with the holes being spaced apart from each other from adjacent to the first end of the third sleeve toward the second end of the third sleeve, the button on the first front leg of said frame unit being received in one of the plurality of holes of the third sleeve of when the third sleeve is connected to the first front leg of said frame unit; a fourth sleeve telescopingly connectable to the second front leg of said frame unit, the fourth sleeve including a first end and a second end, and a wheel unit on the second end of the fourth sleeve; a fourth lock releasably connecting the fourth sleeve to the second front leg, the fourth lock including a plurality of holes defined through the fourth sleeve with the holes being spaced apart from each other from adjacent to the first end of the fourth sleeve toward the second end of the fourth sleeve, the button on the second front leg of said frame unit being received in one of the plurality of holes of the fourth sleeve of when the fourth sleeve is connected to the second front leg of said frame unit.

* * * * *